Nov. 19, 1963 A. E. DE CAMP 3,111,571

ELECTRIC HEATING UNIT

Filed Jan. 26, 1962 3 Sheets-Sheet 1

INVENTOR.
Albert E. De Camp.
BY Wood, Herron & Evans.
ATTORNEYS.

Nov. 19, 1963  A. E. DE CAMP  3,111,571
ELECTRIC HEATING UNIT
Filed Jan. 26, 1962  3 Sheets-Sheet 3

INVENTOR.
Albert E. De Camp
BY
Wood, Herron & Evans.
ATTORNEYS.

United States Patent Office 3,111,571
Patented Nov. 19, 1963

3,111,571
ELECTRIC HEATING UNIT
Albert E. De Camp, Cincinnati, Ohio, assignor to The Williamson Company, Cincinnati, Ohio, a corporation of Ohio
Filed Jan. 26, 1962, Ser. No. 169,005
4 Claims. (Cl. 219—34)

This invention relates to an electric heating unit for use in buildings wherein heat is conveyed by forced air. More particularly, it relates to resistive electric heating units adapted to be used in connection with a central forced air supply, such as a fan or blower.

In most residential and virtually all business buildings which have forced air heating and cooling systems, the source of hot or cold air is a central unit, usually located in the building. From this central unit air duct run between floors and in the walls of the building to various outlets in the individual rooms of the structure, where the ducts terminate in registers or outlets. Generally, air flow regulating dampers are provided at the room outlets for controlling the rate at which air issues into the room so that air flow into unused rooms can be shut off entirely while at the same time maintaining full air flow into other rooms.

A large air blower is customarily employed in connection with the central forced air supply to move the air through the ducts. The central heated air supply in modern structures usually comprises a furnace for heating and an air conditioner for cooling, one or the other being alternatively usable depending upon outside temperature. The same blower and duct system is used in either type of operation to move the air toward the outlets.

In winter, the heating efficiency of the system is severely limited by the heat losses incidental to the movement of hot air from the central furnace through long lengths of uninsulated duct work. In summer, when cold air moves in the ducts, its temperature is raised by the transfer of heat through the duct walls into and again a loss of efficiency occurs. To minimize such losses, the ducts are sometimes insulated with a cellular or fibrous wrapping which is applied but the inclusion of insulation in this type of system, while tending to minimize operating costs, is initially quite expensive and it cannot be added where the additional space it requires is not available.

In order to minimize such heat losses, electric air heating units have become available which are adapted for installation in duct work near each forced air outlet, such that the heat losses in the duct work are minimized and a much more efficient heating system is provided.

Generally, prior art electric heating units of the type just described consist of a section of duct work adapted to be inserted in the duct work of the building within which a resistance type electric coil is mounted. This electric coil is generally connected in series with a switch or thermostat mounted in the room served by the heater. Upon installation of the unit in the existing or a new duct work system of the building at a point adjacent to the outlet or register to be served, air may be forced through the duct work past the heating element and into the room to heat the room. However, since the heaters require 220 volts for operation, it is apparent that thermostats constructed for 220 volt service also are required. These considerations make the wiring installations very expensive.

It has been a primary objective of this invention to minimize such installation costs and the corresponding high cost of materials of the circuit and the thermostat to be used therewith by providing a heating unit which is adapted to utilize a low voltage control circuit and low voltage thermostat.

Another objective of this invention has been to produce an electric heater having a control relay mounted thereon responsive to low voltage signals from a low voltage thermostat for energizing the resistance wiring.

Another object of this invention has been to provide an electric heater which is constructed to provide for cooling of the control unit or terminal box within which the control relay is housed so that its temperature does not exceed permissible limits upon continued operation of the electric resistance heating coils. At present, the Underwriters' Association and many municipal building codes require electrical terminal boxes to be kept under a temperature of 140° F. Any heating unit having a terminal box mounted thereon which fails to conform to this standard is, of course, not acceptable for most household or building applications.

Accordingly, it has been an objective of this invention to provide a self-contained, self-cooled, electrical heating unit adapted to be inserted into the existing duct work of a building and including a control panel attached thereto which may easily be connected to the existing circuitry of the building at a minimal cost.

Generally, the invention comprises a section of duct work within which is fitted a tubular mounting sleeve. The tubular sleeve has flanges at each end which extend outwardly and engage the inner surface of the tubular duct. Each of these flanges has an aligned recess therein which is channeled to receive a stream of unheated air from the duct in which the unit is installed. Extending between the recesses in the flanges is a terminal box mounting bracket which passes through an opening in the duct. A terminal box is mounted upon this bracket and contains the components of a low voltage control circuit. A coil of resistance wire is wound around the inner surface of the mounting sleeve in an axially back and fourth manner so that the area of the sleeve near the terminal box does not have the resistance wiring adjacent thereto. Because the resistance wiring is mounted in this manner within the mounting sleeve, and because the terminal box is always served with cool air, that portion of the sleeve which is near the terminal box remains appreciably cooler than the other portions of the sleeve which have resistance wiring adjacent thereto.

The resistance wire heating element is energized preferably but not necessarily by a 220 volt circuit. This power in turn is controlled by a low voltage (e.g. 12 or 24 volt) control circuit which includes a conventional inexpensive low voltage thermostat. This electric heating unit has the advantage of utilizing a stream of unheated air through the duct to maintain the terminal box at a low temperature so that an uninsulated terminal box may be utilized with the heating system. Furthermore, this invention permits a low voltage control circuit to be used to control the electric heating unit with electrical components of the control circuit mounted in a terminal box attached directly to the heating unit.

The invention is further described with reference to the accompanying drawings in which.

Figures 1, 2:
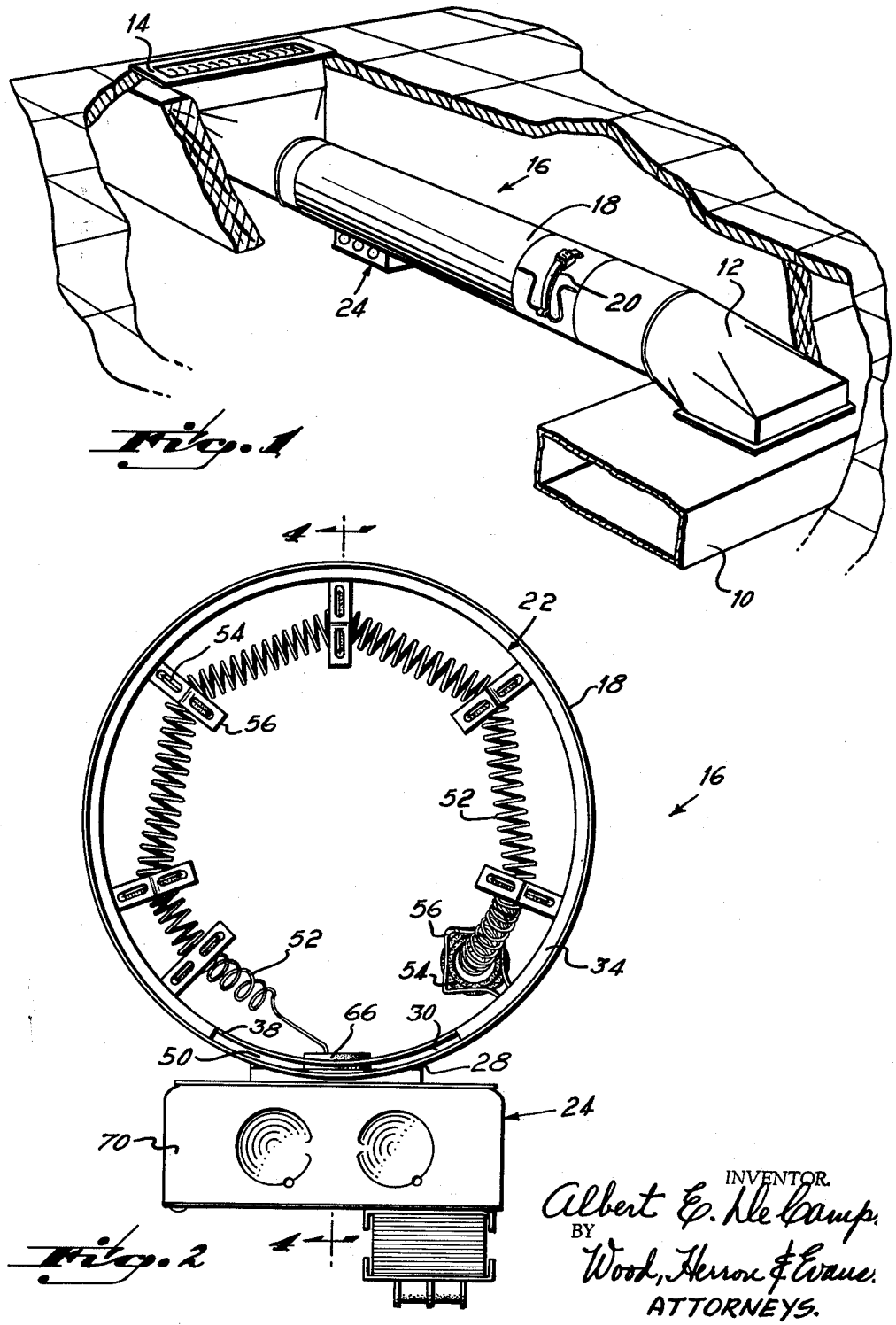
FIGURE 1 is a perspective view of a portion of a heating system incorporating the invention therein.
FIGURE 2 is a front elevation of a section of duct with the heating element incorporated therein and the control unit mounted thereon.

In FIGURE 1 is shown the general arrangement of a centrally located heating and air conditioning system having ducts leading to registers mounted in the floors, ceiling or walls of the building. The figure is diagrammatic and is intended to present only a generalized conception of a central heating or cooling system incorporating the electric heating unit of this invention. In actual practice any number of registers and heating units may be utilized in a system.

A supply of air is forced from a central blower through the duct 10 to a branch duct 12 leading to a register or outlet 14. The supply of forced air may be from a blower, or a blower and furnace, or a blower and air conditioner, or a combination furnace, air conditioner and blower, or a heat pump, none of which are shown in the drawing. As has been noted, in warmer climates the furnace is often omitted, so that the unit comprises only a blower and air conditioner.

In the branch duct 12, immediately upstream of the register 14, that is, toward the blower, is mounted the electric heater unit 16. The electric heater unit includes a short length of duct 18 which is adapted to be substituted in an existing installed system for a piece of duct of similar configuration, to modify the system so as to embody an electric heating unit. Of course, the heater 16 could also be incorporated into a newly installed duct work system at the time of construction or initial installation of the system. To install the electric heating unit, a length of duct having a heater element mounted therein, is inserted in the duct system near a register. The section of duct 18 containing the electric heater element is locked in position in the duct work system by means of conventional draw bands 20.

Figure 3:
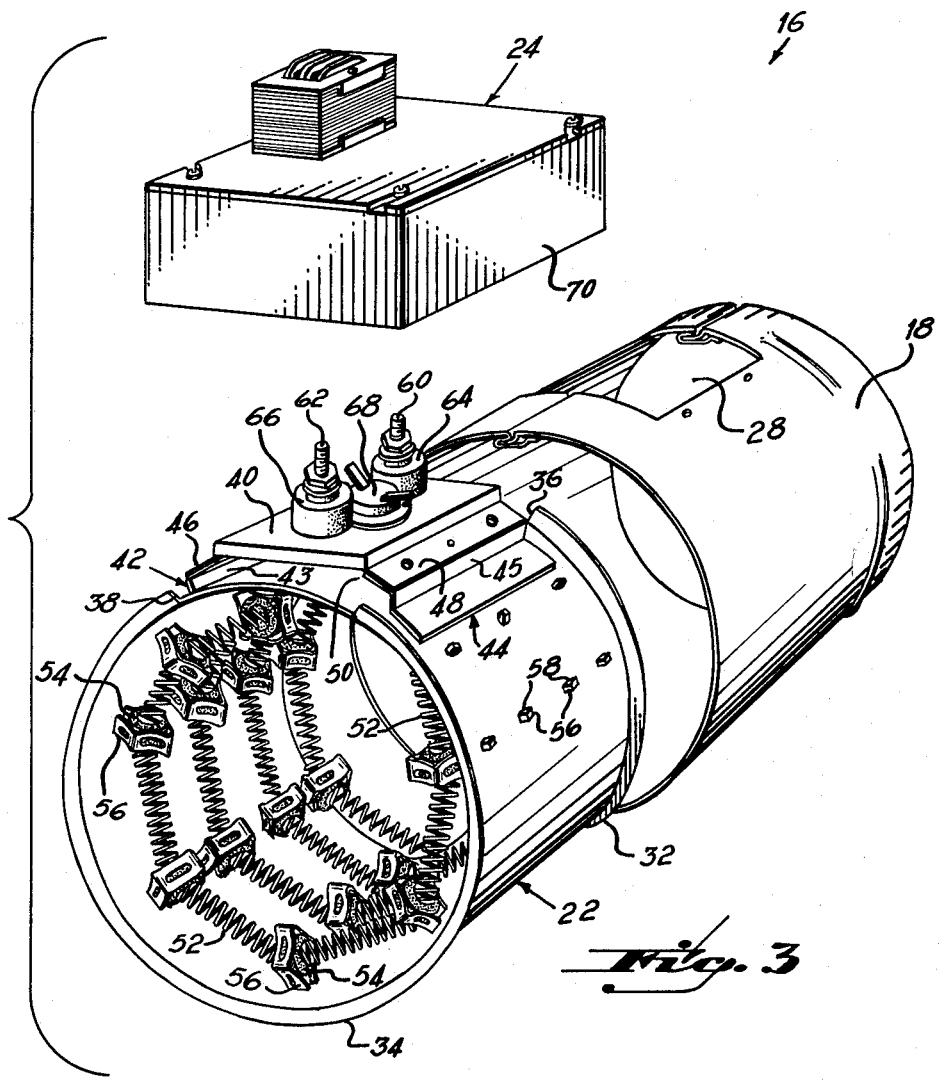
FIGURE 3 is an exploded perspective view of the heating unit, rotated 180° from the view of FIGURE 1.
Figure 4:
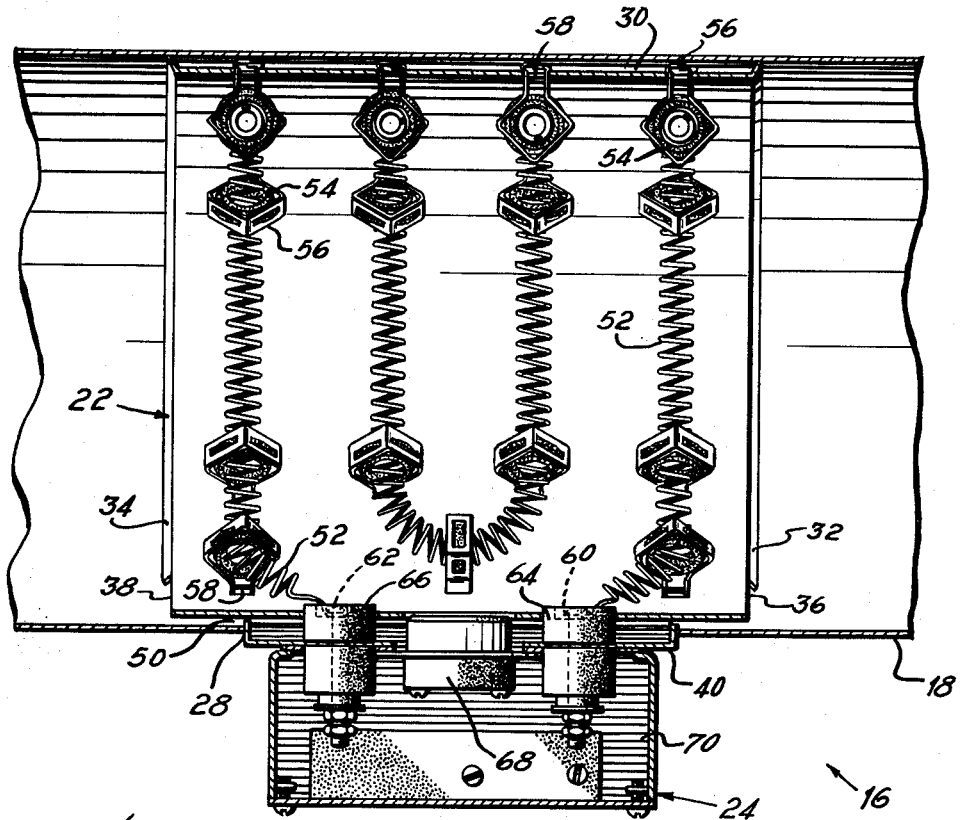
FIGURE 4 is a cross-sectional view of the heating unit taken along line 4—4 of FIGURE 2.

Referring to FIGURES 2, 3 and 4, it will be seen that electric heater unit 16 comprises four basic components; a mounting duct 18, a heater element mounting sleeve 22, an electric heating element 52, and a control unit 24.

The mounting duct 18 is formed from a sheet of sheet metal and has the configuration of the duct system into which it is to be mounted. In the illustrated embodiment the mounting duct is in the shape of a circular sleeve the ends of which are joined by a conventional sheet metal interlocking joint. The mounting duct has a rectangular aperture 28 at one side thereof.

The heater element sleeve is mounted within the mounting duct and is of the same general configuration as the mounting duct. In the illustrated embodiment the heater element sleeve is circular in shape and is somewhat smaller than the mounting duct so that a gap 30 is provided between the heater element sleeve and the mounting duct. Extending radially outwardly from the heater element sleeve at each end thereof, are a pair of flanges 32 and 34. Each of these flanges has a recess 36, 38 therein which extends across one side of the heater element sleeve. These recesses are axially aligned and of approximately the same width as the aperture 28 in the mounting duct.

Two longitudinally extending Z-shaped mounting brackets 42, 44 are connected to the periphery of the heater element sleeve 22 at points adjacent the edges of the flange recesses 36, 38. These mounting brackets 42, 44 extend between the flanges 32, 34 and have one leg of the bracket rigidly connected to the heater element sleeve by welding or other means. The webs 43, 45 of these mounting brackets extend generally radially of the heater element sleeve and are of approximately the same height as the flanges 32 and 34 of the heater element sleeve. A terminal box mounting plate 40 extends through the aperture 28 in the mounting duct and has two downwardly and laterally extending flanges 46, 48 which engage and are welded or connected by other means to the mounting brackets 42, 44.

When the heating unit 16 is placed in a heating system and a current of air is forced therethrough to be heated and distributed to the building through the registers, a channel of unheated air will be forced through a channel 50 between the heater element sleeve 22 and the terminal box mounting plate 40. In this connection, the flanges 32, 34 of the mounting sleeve 22, the mounting sleeve 22, the mounting brackets 42, 44, the mounting plate 40 and the mounting duct 18 cooperate to define the channel 50 through which the stream of unheated air will pass when the heater unit is used in a forced air system.

The heating element per se of the electric heater unit consists of a coil 52 of electrical resistance wire such as Nichrome. This coil of resistance wire 52 is wound around the inner surface of the heater element sleeve 22 and passes through a plurality of ceramic insulators 54 which are mounted in individual spring clips 56. The spring clips 56 are mounted in apertures 58 of the heater element sleeve or may be spot welded to this sleeve. Referring to FIGURES 2, 3 and 4, it will be seen that the ends of the coil of resistance wire are connected to terminals 60 and 62 and that the coil leading from the terminals winds around the inner surface of the heater element sleeve through an arc of approximately 270° and then has a reverse bend of 180° therein and winds back around the inner periphery of the heater element sleeve. In the illustrated embodiment of the invention, the resistance wire consists of four strands extending around the inner periphery of the sleeve and has three reverse bends therein which reverse bends occur at points approximately 270° from each other. It will be noted that the remaining 90° arc through which the coil of resistance wire does not pass is that portion of the heater element sleeve 22 which is immediately adjacent the terminal box mounting plate.

The purpose of winding the coil of resistance wire in this manner with the reverse bends therein rather than in the conventional helical manner about the inner periphery of the heater elements is to prevent that portion of the heater element sleeve immediately adjacent the terminal box mounting plate from becoming excessively hot when the heating unit is in use. Thus, this winding cooperates with the channel 50 through which the unheated air is forced to maintain the temperature of the terminal box at a safe temperature. Since many building codes and the Underwriter's Associations require that terminal boxes housing electrical circuitry therein, remain at a temperature of 140° or less, it is imperative that the terminal box never exceeds this temperature if the heater unit is to be acceptable for ordinary household or business office usage.

The heater element sleeve 22 and the terimnal box mounting plate 40 have three aligned apertures therein within which are mounted two ceramic insulators 64 and 66 and a thermal limit switch 68. The terminals 60, 62 are in the form of screws which pass through center apertures of the insulators 64 and 66 into the terminal box 70 wherein the control unit of the electric heater is housed.

Figure 5:
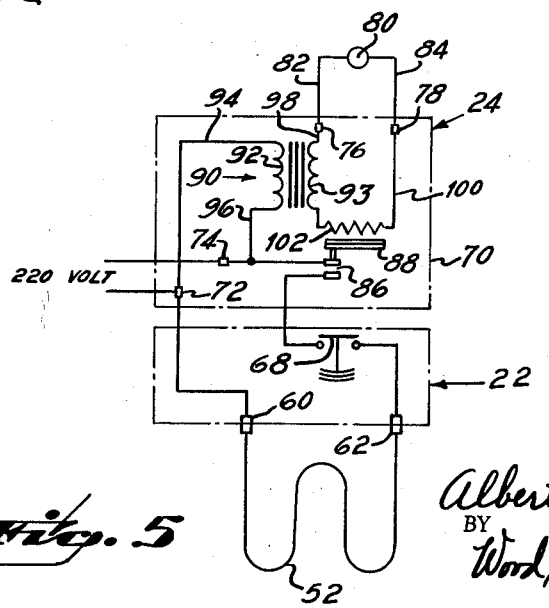
FIGURE 5 is a diagrammatic drawing of the electrical circuit of the heating unit.

Referring to FIGURE 5, wherein the control circuit for the electric heater unit is shown diagrammatically, that portion of the control circuit which is housed within the terminal box is enclosed by dash lines 70 while that portion of the circuitry which is housed within or upon the heater element sleeve is enclosed in dash lines 22.

The terminal box 70 contains four terminals, 72, 74, 76 and 78. Two of these terminals 72, 74 are connected to a 220 volt A.C. source of power. The two other terminals 76 and 78 are connected to a low voltage thermostat 80 by two leads 82, 84. The low voltage thermostat 80 is generally located on the other side of the room from the outlet or register with which the heater unit is utilized. In order to install the electric heater unit it is only necessary to install the heater into the existing duct work in the room and to attach the leads from the power source and the leads from the thermostat to the proper terminals in the terminal box. Thus, it will be seen that this heater unit is very easily installed in an existing forced air heating or air conditioning system.

Within the terminal box, the heater element 52 is connected by leads 82 and 84 to the terminals 72 and 74 respectively. The normally closed thermal limit switch 68 is connected in series with the thermal heater element 52 in lead 84 and acts as a safety switch in the heater element circuit. The thermal limit switch 68 is a conventional switch which opens at a temperature of 136° F. and closes at a temperature of 98° F. Thus, if the heater unit were ever started when the air was not being pumped through the heater element and thus, the heat was not being carried away from the heater, this switch would open at a temperature of 136° and thus, prevent the electric heating unit from becoming a fire hazard.

A normally open, bi-metal actuated load switch 86 is also connected in lead 84 in series with the heater element 52. This switch is adapted to be closed when the bi-metal portion 88 of the switch is heated by the thermostat control circuit.

Power to the thermostat control circuit is supplied by a transformer 90, the primary winding 92 of which is connected by leads 94 and 96 to terminals 72 and 74 within the box 70. The secondary winding 93 of the transformer 90 is connected by leads 98 and 100 through a resistance type heater 102 to terminals 76, 78 within the terminal box. Thus, the secondary winding of the transformer 90 and the resistance heater 102 are connected in series with the thermostat 80 so that the resistance heater 102 will be heated and cause the bi-metal portion 88 of the load switch 86 to close the heater element circuit when the thermostat control circuit is closed through the thermostat 80.

When it is desired to utilize the electric heating unit to heat the room with which the heating unit is connected, a switch (not shown) in the power supply circuit to the terminals 72 and 74 is closed, and the thermostat 80 is set to the desired temperature. The circuit to the primary winding of the transformer 90 is completed by the closure of the switch (not shown) in the 220 volt source of current and if the room temperature is less than that set into the thermostat 80 the circuit to the resistance 102 is complete and power from the secondary winding of the transformer will be supplied to the resistance heater 102. A low voltage, such as 24 volts, is supplied from the secondary winding 93 of the transformer to the thermostat 80 and the resistance heater 102. When the thermostat control circuit has closed, and the heater element 102 has heated for a few seconds, it causes the closure of the bi-metal load switch 86 which in turn completes the circuit to the heater element through the leads 82 and 84.

While the control circuit has been described as utilizing a bi-metal load switch, modifications in this circuit could be incorporated without departing from the spirit of the invention. Thus, a magnetically controlled switch actuated by flux changes in the transformer could be substituted for the bi-metalic switch. Similar modifications could also be made in the other components of the control circuit.

This electric heating unit has the advantage of permitting the usage of low voltage wiring in the thermostat control circuit and the use of a low voltage thermostat with the consequent savings in cost. Additionally because of the air flow characteristics of the heater unit, an un-insulated terminal box may be utilized which will remain at a low enough temperature to meet the building standards of all cities and underwriting associations.

This heater unit has the added advantage of being very easily installed in the existing duct work of the building with which the heating units are to be utilized. In order to install this heater unit in the building it is only necessary to remove a section of duct work and insert the section of duct work containing the electric heating element, and to connect the four terminals of the terminal box to the proper power source and to the thermostat.

It will be understood that the above detailed description is made by way of illustration and not limitation, it being contemplated that modifications in the details of the invention may be made without departing from the scope of the appended claims.

Having described my invention, I claim:

1. A low voltage controlled electric heating unit adapted to be utilized in a forced air system comprising, a section of duct in the form of an outer sleeve, an inner sleeve mounted within said outer sleeve, longitudinally extending channel means between said sleeves having lateral edges defined by a pair of longitudinally extending members, an electric heating element wound in an axially reversing manner mounted around the inner surface of said inner sleeve, said element having reverse curves occurring at points adjacent said longitudinally extending members, a terminal box mounted upon said heating unit over said channel means whereby air passing through said channel means cools said terminal box, and a low voltage thermostat controlled switch mounted within said terminal box, said switch being operative to control a high voltage circuit to said electric heating element.

2. A low voltage controlled electric heating unit adapted to be utilized in a forced air system, said unit including a heating element mounting sleeve, an electrical heating element mounted within said sleeve, said heating element being wound in a reversing manner around the inner surface of said sleeve, said element having reverse loops spaced apart within said sleeve to leave a longitudinally extending portion of said sleeve between said loops without any of said heating element adjacent thereto, a terminal box mounted on said unit outside said sleeve at a point adjacent said portion of said sleeve, a low voltage thermostat controlled switch mounted within said terminal box, said switch being operative to control a high voltage circuit to said electric heating element.

3. A low voltage controlled electric heating unit adapted to be utilized in a forced air system, said unit including a first sleeve, a second heating element mounting sleeve mounted within said first sleeve, an electrical heating element mounted within said second sleeve, said heating element being wound in a reversing manner around the inner surface of said second sleeve, said element having reverse loops of the winding spaced apart within said second sleeve to leave a longitudinally extending portion of said sleeve between said loops without any of said heating element adjacent thereto, a channel means extending between said sleeves to receive a stream of forced air therethrough, a terminal box mounted upon said heating unit outside said channel means at a point adjacent said portion of said second sleeve whereby said terminal box is cooled by air flowing through said channel means, and a low voltage thermostat controlled switch mounted within said terminal box, said switch being operative to control a high voltage circuit to said heating element.

4. A low voltage controlled electric heating unit adapted to be utilized in a forced air system, said unit including a first sleeve, a second heating element mounting sleeve mounted within said first sleeve, an electrical heating element mounted within said second sleeve, said heating element being wound in an axially reversing manner around the inner surface of said second sleeve, said element having reverse loops spaced apart within said second sleeve to leave a longitudinally extending portion of said sleeve between said loops without any of said heating element adjacent thereto, channel means extending between said sleeves to permit a stream of forced air to pass therethrough, a terminal box mounted upon said heating unit outside of said channel means at a point adjacent said portion of said second sleeve whereby said terminal box is cooled by air flowing through said channel means while air passing through said second sleeve is heated, a switch mounted within said terminal box, and a control circuit for controlling the flow of high voltage current to said heating element, said control circuit including a low voltage thermostat connected to said switch whereby closure of said switch allows high voltage current to flow to said heating element.

References Cited in the file of this patent
UNITED STATES PATENTS

| | | |
|---|---|---|
| 631,360 | Creveling | Aug. 22, 1899 |
| 2,022,453 | Ball | Nov. 26, 1935 |
| 2,477,734 | Gehrke | Aug. 2, 1949 |
| 2,980,785 | Whitney | Apr. 18, 1961 |